H. E. HOLLEY.
OPHTHALMIC MOUNTING.
APPLICATION FILED DEC. 30, 1915.

1,227,620.

Patented May 29, 1917.

WITNESSES
H. F. Costello
Carroll Bailey

INVENTOR
HENRY E. HOLLEY
BY Richard Eleven
ATTORNEY

UNITED STATES PATENT OFFICE.

HENRY E. HOLLEY, OF OTISVILLE, NEW YORK.

OPHTHALMIC MOUNTING.

1,227,620.  Specification of Letters Patent.  Patented May 29, 1917.

Application filed December 30, 1915. Serial No. 69,453.

*To all whom it may concern:*

Be it known that I, HENRY E. HOLLEY, a citizen of the United States, residing at Otisville, in the county of Orange and State of New York, have invented certain new and useful Improvements in Ophthalmic Mountings, of which the following is a specification.

This invention relates to ophthalmic mountings and has particular reference to an improved construction of eye-glass mounting.

In the ordinary form of screw mounting and in a majority of the cement forms of mounting, a hole either has to be drilled in the lens to accommodate the lens screw or else it is necessary to provide a notch or recess in the lens to insure of the cement taking a firm grip thereto. Moreover, in the forms of mountings mentioned, when a lens is broken and it is desired to replace the same with a new one, it is necessary to call in the services of an optician in order to have a screw hole drilled in the lens or the lens notched before the same can be applied to the mounting. My invention not only aims to overcome these objectionable features by providing a mounting in which a lens may at any time be removed or replaced by the wearer without the employment of any special tools or fastening elements to drill or notch the lens and apply the same to the mounting, but provides a mounting which will in no way interfere with the field of vision; provides for the attainment of a narrow pupillary distance; provides for adjustment so that the mounting may be adapted to various facial configurations; is so constructed that lenses of various sizes and shapes may be readily applied thereto and is so arranged that the same may be stamped from a single blank of material at small cost.

In the accomplishment of the foregoing objects, the invention consists in the novel features of construction as will be hereinafter more fully described, illustrated in the accompanying drawings, and claimed.

In the drawings:—

Figure 1:
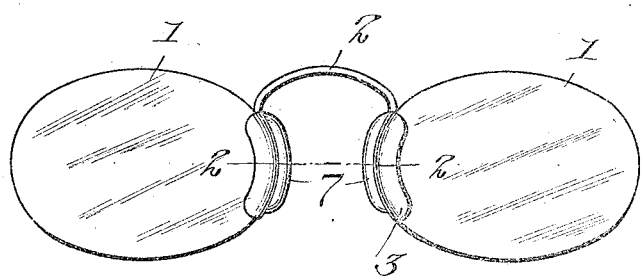
Figure 1 is a front view of a pair of eye glasses equipped with the improved form of mounting.
Figure 2:
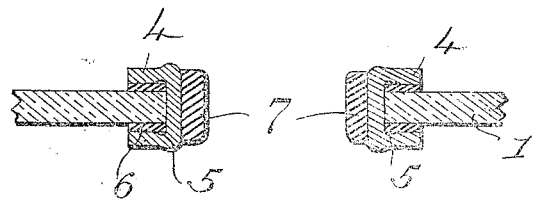
Fig. 2 is a sectional view on the line 2—2 of Fig. 1.
Figure 3:
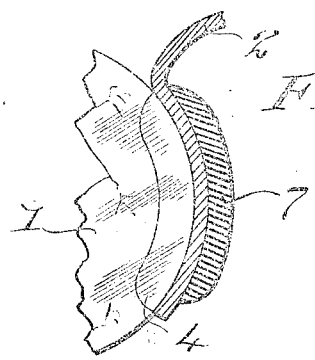
Fig. 3 is an enlarged detail vertical sectional view through one of the lens clips.

Referring to the drawings by numerals wherein is illustrated the preferred embodiment of my invention, 1 designates the lenses which are connected by the bridge 2 through the medium of the clips 3. The bridge 2 is formed of sufficiently heavy material to hold the lenses against sagging or pivotal movement and is preferably resilient in its nature as well as yieldable, so that adjustment thereof may be accomplished to adapt the mounting to faces of varying configurations.

Formed upon and extending laterally from the terminal ends of the bridge 2 are the clip ears 4 which are adapted for engagement with the sides of the lenses 1. These clip ears 4 are resilient so as to provide a firm grip upon the edge of the lens when the lens is inserted between the ears and are adapted to frictionally engage therewith to prevent the accidental removal of the lens therefrom.

In forming the bridge and lens clips, the clips and bridge are preferably stamped from a single piece of material and the clips then bent at an angle to the bridge to provide pockets to receive the lenses, and in bending the ears 4, an offset portion is provided adjacent the point of connection of the ears with the bridge as shown at 5, thereby providing a means of adjustment whereby the ears may be adjusted toward or away from each other to accommodate lenses of various thicknesses.

In the preferred embodiment of my invention, I interpose between the inner faces of the ears 4 and the adjacent outer faces of the lenses 1, pads 6 of a yieldable material such as rubber or the like which serve to further increase the gripping power of the yieldable ears 4 and reduces to a minimum a liability of accidental removal of the lenses from the clips.

The ears 4 are made relatively narrow so as to extend but a slight distance over the inner and outer faces of the lenses, thereby providing a mounting which will in no way interfere with the field of vision of the wearer, while because of the fact that the bridge 2 is formed of one piece with the clips 3 and extends from the upper edges of the clips and connects the same, a mounting is provided in which a very narrow pupillary distance is obtainable, the thickness only of the material from which the bridge and clips are constructed, and if desired pads 7 which may be placed upon the inner faces of the clips to prevent irritation of the nose comprising the entire thickness of material between the edges of the lenses.

From the foregoing description taken in connection with the accompanying drawings it will be seen that by slightly bending the clips, lenses of various sizes may be adapted thereto while because of the interposition of the yieldable material, which is between the clip ears and the lens, will effectually prevent the accidental removal of the lens from the clip.

From the foregoing description taken in connection with accompanying drawings, it is thought that the construction and operation of the improved mounting will be clearly understood and while I have herein shown and described one preferred embodiment of my invention I do not wish to be limited thereto except for such limitations as the claim may import.

I claim:—

An ophthalmic mounting including lenses, a bridge having a pair of clip ears projecting laterally from either end, said clip ears having rounded edges, the main portions of said clip ears being directed toward one another and then extended in parallel relation, thereby providing a pocket of increased width at its inner portion between each pair of clip ears, a pair of flat cushion members positioned in each pair of clip ears and engaging the inner faces thereof, said cushion members having clamping engagement with opposite sides of the lenses, said clips being adapted to be adjusted with respect to one another to accommodate lenses of different thicknesses, and cushion members on the inner sides of the ends of said bridge to serve as cushion pads and cover the ends of the bridge.

In testimony whereof I affix my signature in presence of two witnesses.

HENRY E. HOLLEY.

Witnesses:
    WM. A. TINNEY,
    FRED BAILY.